US008800412B2

(12) United States Patent
Griffin

(10) Patent No.: US 8,800,412 B2
(45) Date of Patent: Aug. 12, 2014

(54) AUXILIARY POWER TOOL HANDLE

(75) Inventor: Paul W. Griffin, Pleasant Prairie, WI (US)

(73) Assignee: Snap-On Incorporated, Kenosha, WI (US)

( * ) Notice: Subject to any disclaimer, the term of this patent is extended or adjusted under 35 U.S.C. 154(b) by 421 days.

(21) Appl. No.: 13/213,251

(22) Filed: Aug. 19, 2011

(65) Prior Publication Data

US 2013/0042730 A1   Feb. 21, 2013

(51) Int. Cl.
*B25G 3/00*  (2006.01)
*F16B 9/00*  (2006.01)
*B25F 5/02*  (2006.01)

(52) U.S. Cl.
CPC ...................................... *B25F 5/026* (2013.01)
USPC .............................. 81/491; 403/235; 403/236

(58) Field of Classification Search
USPC .............................. 403/233, 235, 236; 81/491
See application file for complete search history.

(56) References Cited

U.S. PATENT DOCUMENTS

| | | | | |
|---|---|---|---|---|
| 1,572,995 A | * | 2/1926 | Gates | 74/557 |
| 2,706,423 A | * | 4/1955 | Rose | 81/487 |
| 4,276,675 A | * | 7/1981 | Pioch | 16/426 |
| 4,368,556 A | * | 1/1983 | Wanner et al. | 16/436 |
| 4,881,294 A | * | 11/1989 | Riedl | 16/426 |
| 5,352,060 A | * | 10/1994 | Poetker | 403/233 |
| 6,807,883 B1 | * | 10/2004 | Rinner | 81/177.5 |
| 2005/0249564 A1 | | 11/2005 | Van Bergen et al. | |

OTHER PUBLICATIONS

PCT International Search Report,dated Oct. 26, 2012, 2 pages.
PCT Written Opinion of the International Search Authority, dated Oct. 26, 2012, 8 pages.
PCT International Preliminary Report on Patentability dated Feb. 25, 2014, 6 pages.

* cited by examiner

*Primary Examiner* — Bryan R Muller
(74) *Attorney, Agent, or Firm* — Seyfarth Shaw LLP

(57) ABSTRACT

A handle for controlling a power tool by configuring the handle in either a straight or T-shaped position. In the straight position, the handle design serves as a rotational safety control that allows a user to control the rotational reaction of the tool by placing the user's hand in a position that is perpendicular to the main body of the tool. In the T-shaped configuration, the user can apply rotational force and longitudinal force more easily because the hand position is tangent to the tool base. A fastener couples a base of the handle to a band that grips the power tool and facilitates the user control.

15 Claims, 5 Drawing Sheets

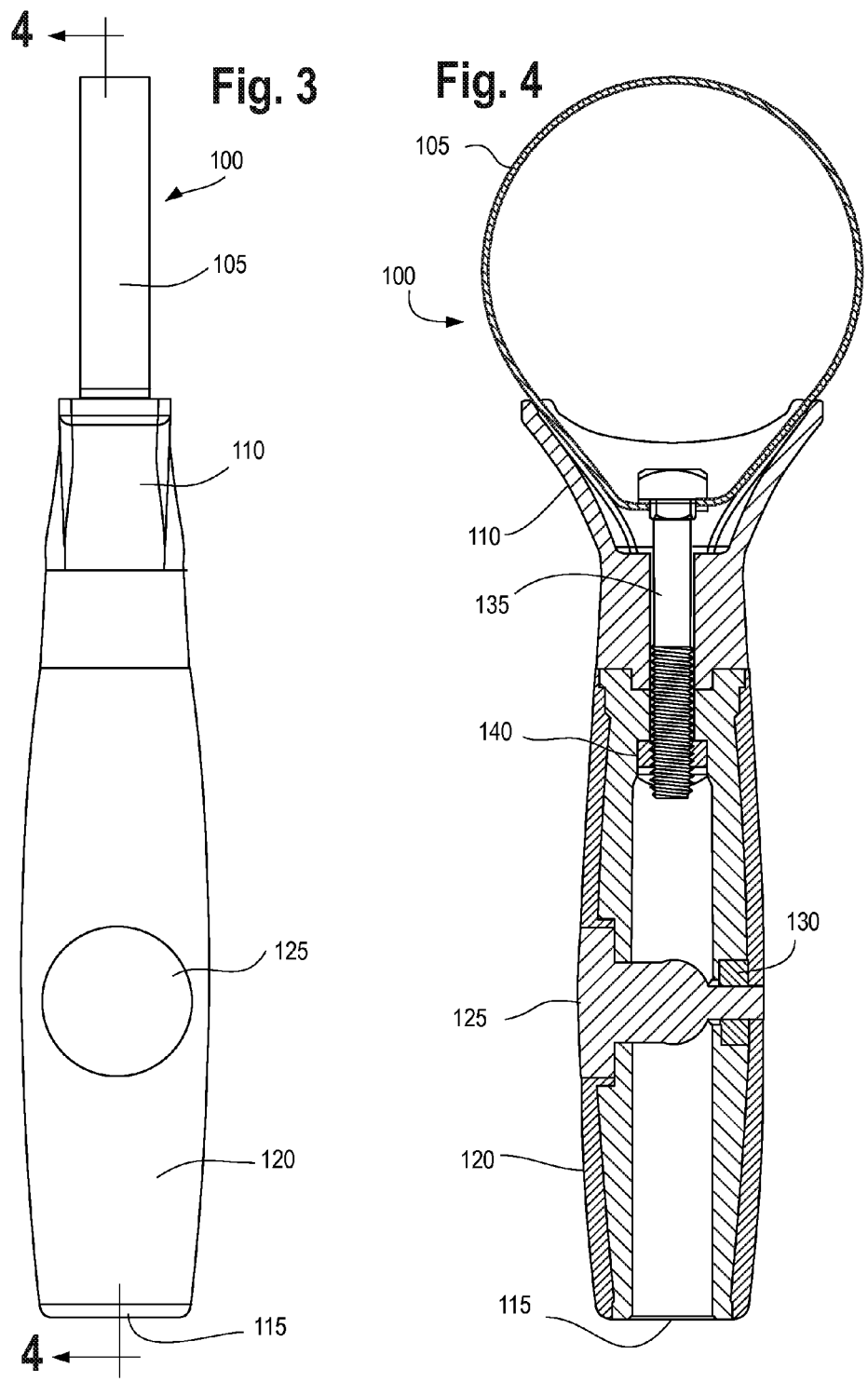

AUXILIARY POWER TOOL HANDLE

FIELD OF THE INVENTION

The present application relates generally to a handle for a power tool. More particularly, the present application relates to an auxiliary power tool handle that can be adjusted to either a straight line or T-shaped configuration.

BACKGROUND OF THE INVENTION

Power tools are commonly used to complete industrial or home improvement tasks. Many power tools are portable and battery-powered or fuel cell powered, allowing a user to apply considerable torque or force on a workpiece without exerting a substantial amount of energy. However, many power tools produce significant vibrations and rotational forces during use, or can otherwise be difficult to control due to the amount of power that is transmitted from the tool to the workpiece or working material.

Several attempts have been made to resolve the above issue. For example, handles have been developed that allow a user to hold the power tool with one hand, and control the movement of the power tool by gripping the handle with the other hand. The handle can normally be removed from the tool and allow a conventional, handle-free operation of the tool based on the preference of the user.

Conventional power tool handles typically hook into a back portion of the power tool and are spring-mounted into place. This configuration encourages the user to apply force on the tool in a direction that is not parallel to the main body of the tool, leading to possible damage of the bits or other components held in the working end of the tool. Also, the two hands of the user and the cutting point of the tool form a triangle that results in user discomfort and fatigue. For example, in the above-described triangle, the user's hands are far apart from one another, and both hands are perpendicular to the main body of the tool. The conventional configuration therefore results in hand and wrist discomfort that ultimately causes the tool bit to bend, twist and break.

SUMMARY OF THE INVENTION

The present application improves upon the conventional power tool handle by providing a handle that can be configured in either a straight or T-shaped position. In the straight position, the handle design serves as a rotational safety control that allows a user to control the rotational reaction of the tool by placing the user's hand in a position that is perpendicular to the main body of the tool. In the T-shaped configuration, the user can apply rotational force and longitudinal force more easily because the hand position is tangent to the tool body.

The present application discloses a handle for controlling a power tool, including a band adapted to grip the power tool; a fastener coupled to the band; and a base, the base having a first end and a second end opposite the first end, wherein the base includes a first connection portion and a second connection portion that are each adapted to receive the fastener and couple the band to the base, the first connection portion being located proximate the first end and the second connection portion being located between the first end and the second end.

Also disclosed is a combination including a power tool; and a handle that is detachably coupled to the power tool and includes a band adapted to grip the power tool; a fastener coupled to the band; and a base, the base having a first end and a second end opposite the first end, wherein the base includes a first connection portion and a second connection portion that are each adapted to receive the fastener and couple the band to the base, the first connection portion being located proximate the first end and the second connection portion being located between the first end and the second end.

BRIEF DESCRIPTION OF THE DRAWINGS

For the purpose of facilitating an understanding of the subject matter sought to be protected, there is illustrated in the accompanying drawing embodiments thereof, from an inspection of which, when considered in connection with the following description, the subject matter sought to be protected, its construction and operation, and many of its advantages should be readily understood and appreciated.

FIG. 3 is a side view of the handle shown in the straight configuration;

FIG. 4 is a sectional view of the handle shown in the straight configuration;

DETAILED DESCRIPTION OF THE PREFERRED EMBODIMENTS

Figure 1:
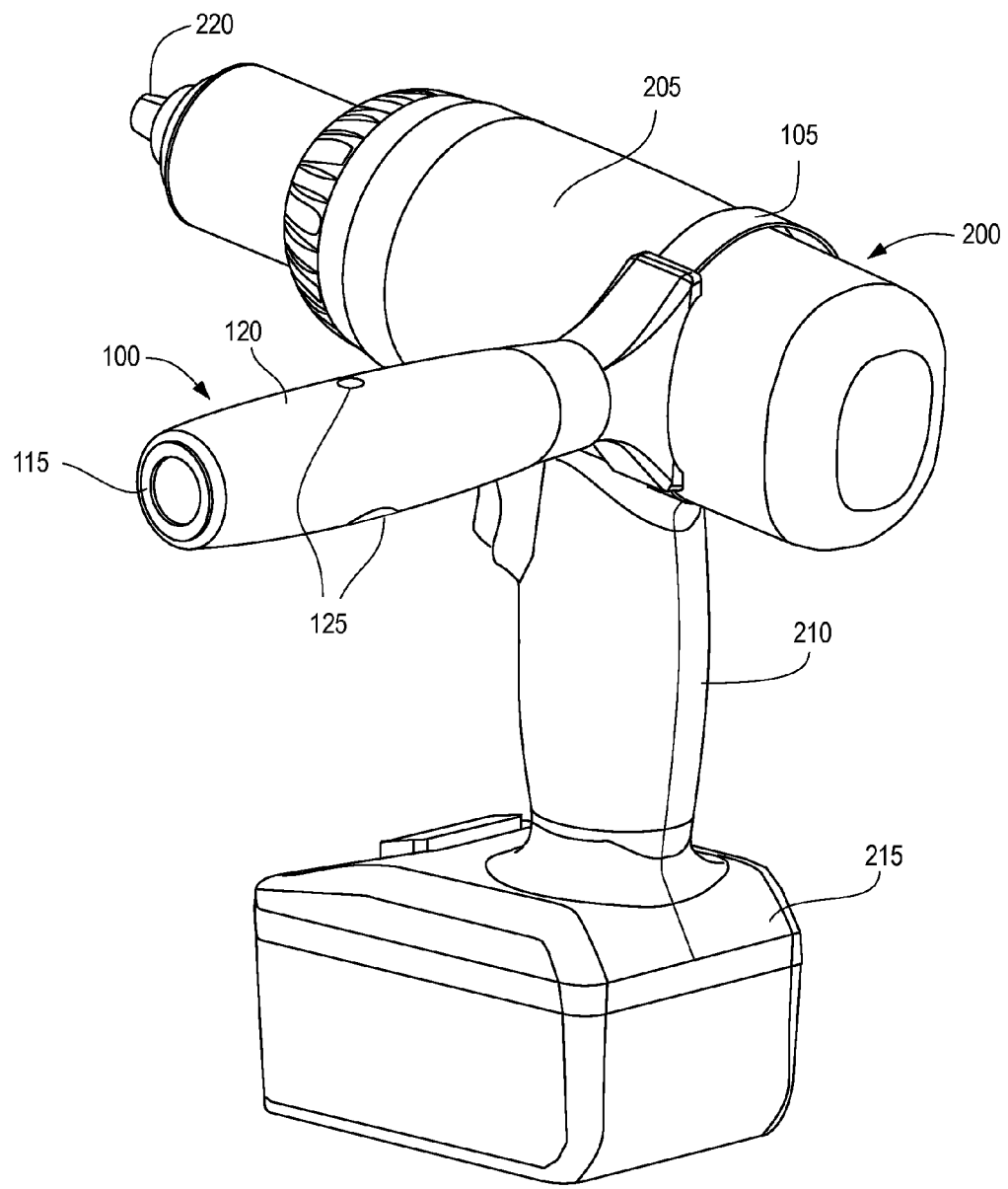
FIG. 1 is an isometric view of an embodiment of the handle and tool according to the present application.

While this invention is susceptible of embodiments in many different forms, there is shown in the drawings and will herein be described in detail a preferred embodiment of the invention with the understanding that the present disclosure is to be considered as an exemplification of the principles of the invention and is not intended to limit the broad aspect of the invention to embodiments illustrated.

The present application discloses a handle that can be configured in either a straight or T-shaped position based on user preference. In the straight position, the handle allows the user to control rotational forces of the tool, and in the T-shaped configuration, the user can apply rotational force and longitudinal force more easily because the hand position is tangent to the tool body. The handle is easily adjusted from the straight to T-shaped positions and can also be removed from the power tool if the user so chooses.

Figure 2:
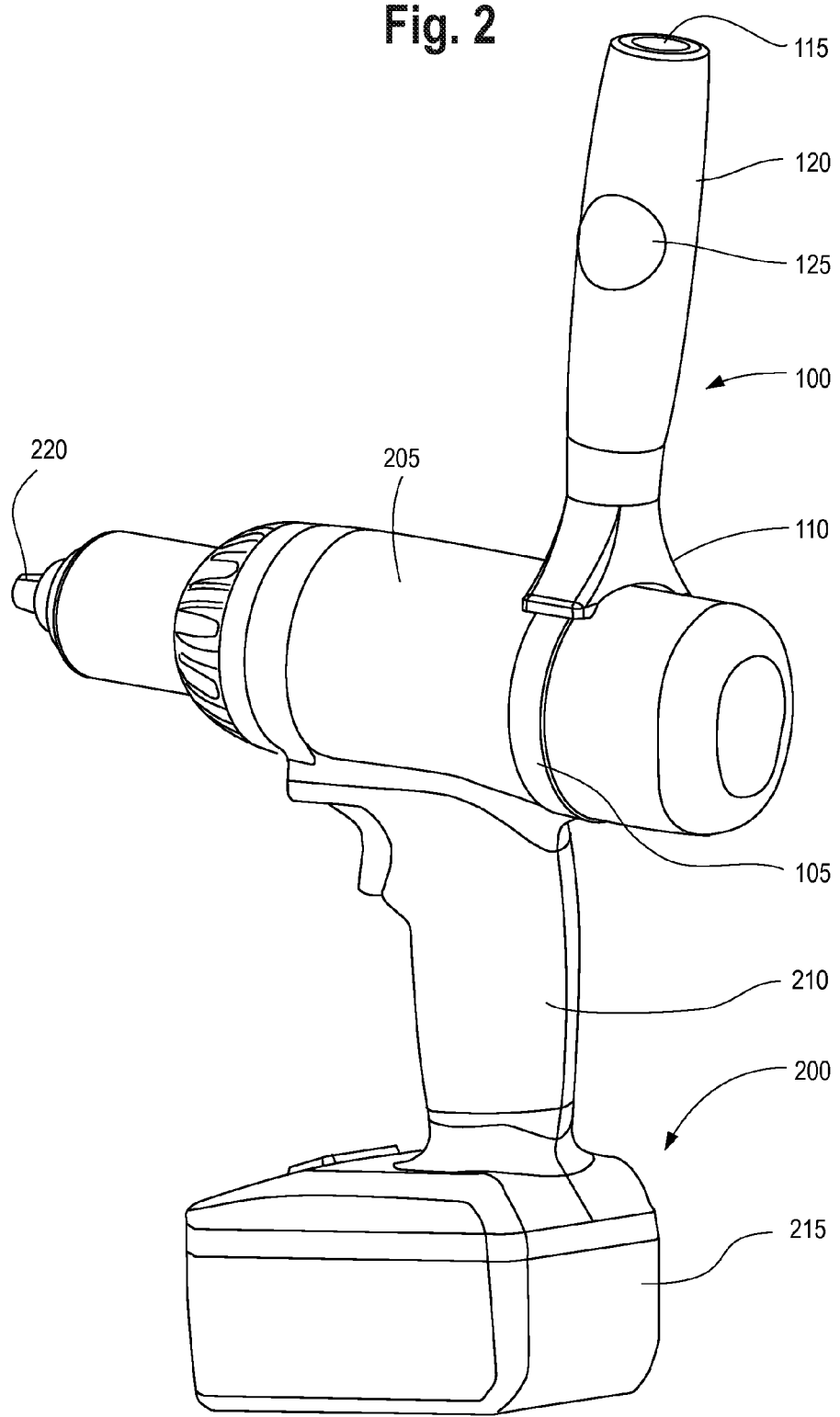
FIG. 2 is an isometric view of the handle configured in a different position than that shown in FIG. 1.

As shown in FIGS. 1-3, the handle 100 is coupled to the power tool 200 and allows a user to control movement of the power tool 200. The handle 100 includes a band 105 that grips the power tool 200, a collet 110 for holding the band 105, and a base 115 coupled to the collet 110 and ergonomically shaped to a user's hand. A grip 120 can be provided on the base 115 to improve the user's grasp of the handle 100, and a plug 125 can be inserted into the base 115 to conceal various receiving portions, as will be discussed below in more detail.

FIG. 4 illustrates the internal components of the handle 100, including the collet 110, base 115, grip 120 and plug 125. As shown, the plug 125 is held within the base 115 by a plug nut 130, and the band 105 is coupled to the base 115 by a fastener 135. The base 115 further includes a fastener nut 140 that receives the fastener 135 and that includes threads corresponding to those of the fastener 135.

Figure 5:
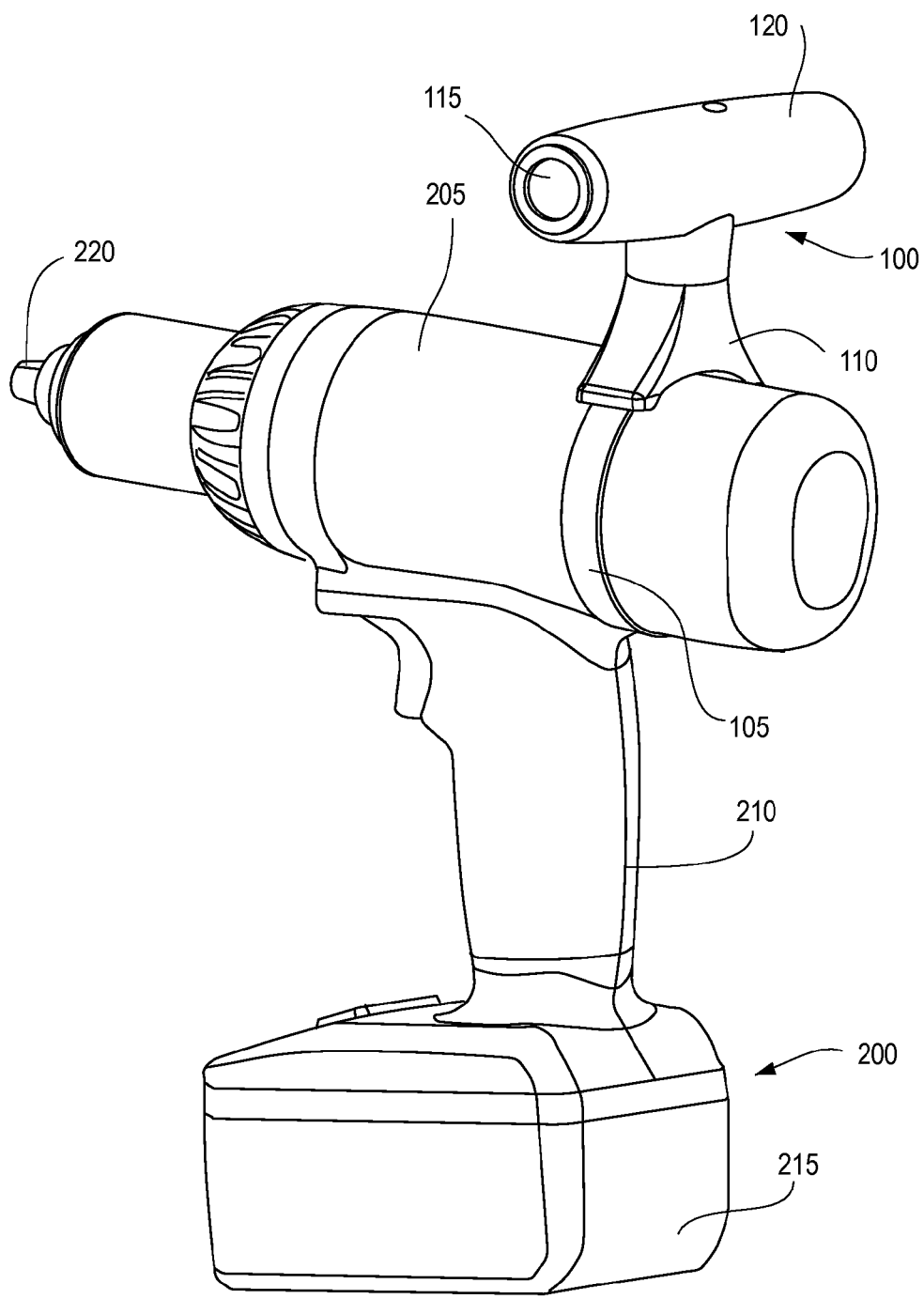
FIG. 5 is an isometric view of the handle and tool shown in the T-shaped configuration, according to the present application.

The power tool 200 can be any tool that is powered by any conventional means, such as, for example, electric power, battery, compressed air, electric motor, internal combustion engine, steam engine, wind power, solar power, fuel cell and/or moving water. Alternately, the power tool 200 can be a tool that is operated by manual human means, such as a hand-powered screwdriver or other such tool. The exemplary power tool 200 shown in FIGS. 1, 2 and 5 is a power drill with a main body 205 coupled to a tool handle 210 and further including a battery portion 215 for holding a battery or other power source. The power tool 200 also includes a working end 220, for example, a chuck for holding a drill bit.

The band 105 is sized and shaped to fit the main body 205 of the power tool 200 and grip the power tool 200 during use. The band 105 can be made of any material, for example, a rigid or flexible polymeric material, an elastomeric material, or a stiff or flexible fabric, so long as the band 105 is capable of engaging or holding the power tool 200 during use.

In an embodiment, the band 105 is made of metal, and the user simply slips the band over the power tool 200 prior to use. To tighten the band, the user simply rotates the handle 100 to tighten a fastener into a nut (discussed below in more detail) and pull the band 105 closed. Alternately, the band 105 is made of an elastomeric material with a diameter smaller than a diameter of the main body 205 of the power tool 200. A user can position the band 105 over the main body 205 of the power tool 200, as shown in FIGS. 1, 2 and 5, and can grip the power tool 200 for better control during operation. In yet another embodiment, the band 105 can be retractable into the collet 110 if the user pushes a button (not shown), similar to a retractable leash for pets. In yet another embodiment, the band 105 can be fixed in position if the user pushes the button, and is otherwise constantly biased onto the closed position, similar to a conventional measuring tape. Any other configuration that allows the band 105 to better grip the power tool 200 can be implemented without departing from the spirit and scope of the present application.

As shown, the collet 110 is coupled to the band 105 by way of the fastener 135 being inserted into a receiving portion of the collet 110. The collet 110 can be arcuate in an area that supports the band 105, and can include a flat portion inside the collet 110 for receiving a head of the fastener 135. At an end of the collet 110 opposite the band 105, the collet 110 can be shaped to engage corresponding structure in the base 115 so that the collet 110 and base 115 form a continuous structure. The collet 110 can be made of any material, including metal, polymeric or composite materials, and should be strong enough to withstand the stress provided by the power tool 200 when in use and while the user manipulates the handle 100.

Figure 7:
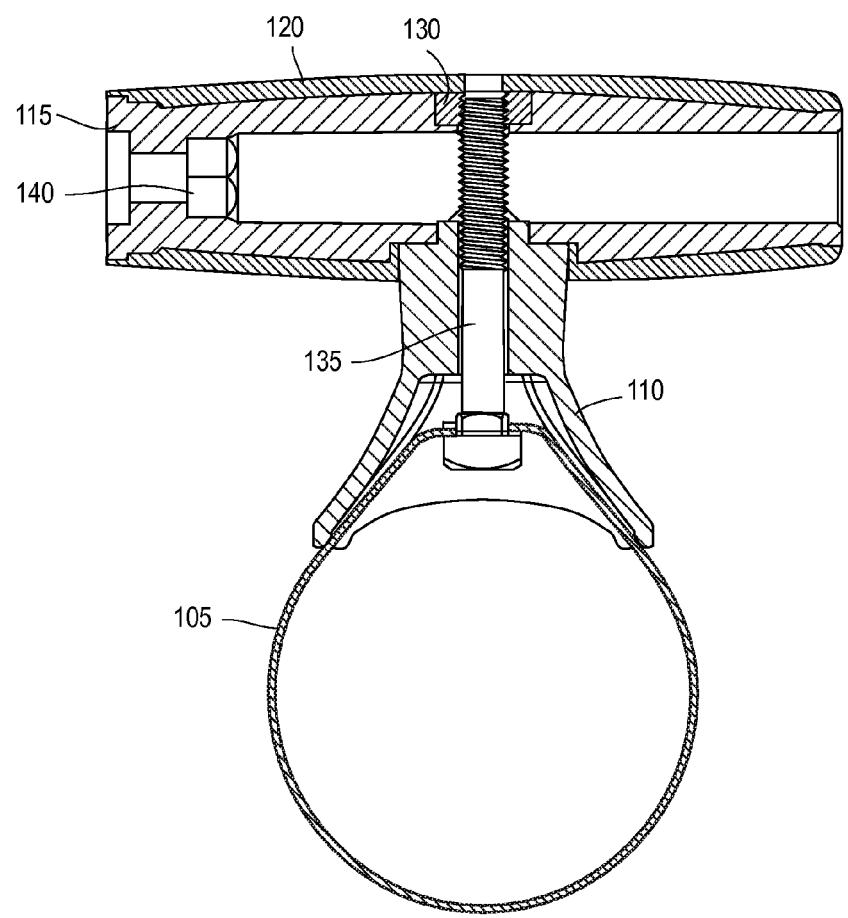
FIG. 7 is a sectional view of the handle in the T-shaped configuration.

The grip 120 is coupled to the base 115 in a coaxial relationship, as shown in FIGS. 4 and 7. The exact coupling relationship between the grip 120 and base 115 can be varied. For example, the grip 120 can be glued to the base 115, fastened to the base 115 through fasteners, or the grip 120 can be an elastomeric material that is elastically biased against the base 115. The exact grip 120 material can also be varied, and can include rubber, plastic, leather, textured metal, or any other material that helps the user grip the handle 100.

The plug 125 can be inserted into the base 115 and held in place by the plug nut 130, as shown in FIG. 4. Alternately, the plug 125 can be friction fit inside the base 115 or fastened to the base 115 through threads. The plug 125 can extend partially through the base 115 or can extend entirely through the base 115, as shown in FIG. 4. In an embodiment, the plug 125 has a shape similar to the shape of the end of the collet 110 distal to the band 105 such that the end of the collet 110 can be inserted into the same area of the base 115 that the plug 125 is inserted into once the plug 125 is removed. In this manner, the collet 110 and the base 115 can include corresponding structure allowing for a continuous transition from the collet 110 to the base 115, as shown in FIG. 7.

The plug 125 can be stored in several ways when the plug 125 is removed from the base 115. For example, the plug 125 can be inserted into a side of the base 115, can be attached to the base 115 with a string, or can fit into corresponding structure in the power tool 200.

The base 115 extends in a longitudinal direction, hereinafter defined as a base longitudinal axis. Also, the fastener 135 extends in an axial direction and has what will be hereinafter referred to as a fastener longitudinal axis. The base 115 can therefore be configured in at least two separate positions: (1) a first position, in which the base longitudinal axis is aligned with the fastener longitudinal axis and the fastener 135 is coupled to the band nut 140, and (2) a second position, in which the base longitudinal axis is perpendicular to the fastener longitudinal axis and the fastener 135 is coupled to the plug nut 130. Position (1) above is shown in FIGS. 1-4, and Position (2) above is shown in FIGS. 5-7.

In Position (1), the base 115 is straight and aligned with the fastener 135, providing the user with an easy to grip handle 100 that helps control rotational forces of the power tool 200 during use. Also, the user's hand is aligned perpendicular to the main body 205 of the power tool 200, providing added user comfort and reducing user fatigue. The user can also rotate and secure the handle 100 in several different orientations within Position (1), including the orientations shown in FIGS. 1 and 2. The FIG. 1 orientation provides a top handle configuration, where the FIG. 2 orientation provides a side handle orientation. Of course, the handle 100 can be oriented in any way within Position (1), whether on the top, side, or at an angle to the main body of the power drill 200, without departing from the spirit and scope of the present application.

Figure 6:
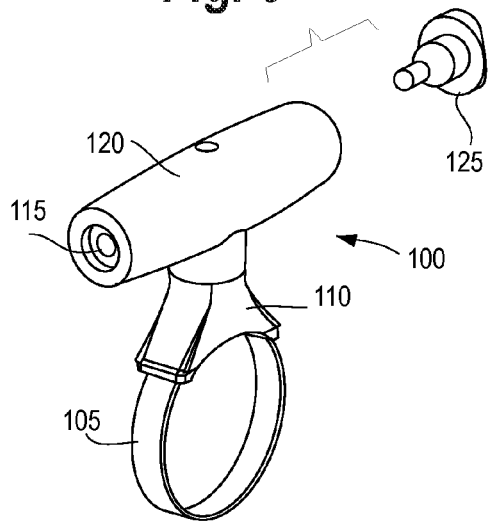
FIG. 6 is an isometric view of the handle with the plug removed.

As shown in FIGS. 5-7, Position (2) involves the base 115 being connected to the collet 110 by the fastener 135 in a T-shaped configuration. The plug 125 can be removed from the base 115 and the fastener 135 can couple the base 115 to the collet 110 at the plug nut 130. As shown in FIG. 7, an end of the collet 110 can have a structure similar to the plug 125 so that, like Position (1), the collet 110 can engage the base 115 in a continuous manner. The band nut 140 can remain idle in Position (2) without any corresponding structure attached, or can serve as a holding component for the plug 125.

In Position (2), both rotational and longitudinal forces can be applied more easily because the hand position is tangent to the main body 205 of the power tool 200. The configuration of Position (2) therefore encourages the user to control the power tool 200 rather than apply dangerous force on the power tool 200 that would likely lead to unwanted rotation and ultimately damage a bit or other device secured in the working end 220.

The manner set forth in the foregoing description and accompanying drawings and examples, is offered by way of illustration only and not as a limitation. More particular embodiments have been shown and described, and it will be apparent to those skilled in the art that changes and modifications may be made without departing from the broader aspects of Applicant's contribution. The actual scope of the protection sought is intended to be defined in the following claims when viewed in their proper prospective based on the prior art.

What is claimed is:

1. A handle for controlling a power tool, comprising:
   a band adapted to grip the power tool;
   a fastener coupled to the band;

a base having first and second opposing ends, and first and second connection portions, wherein each of the first and second connection portions is adapted to receive the fastener and couple the band to the base, the first connection portion being located proximate the first end and the second connection portion being located between the first and second ends; and a plug adapted to be optionally engaged with both of the first and second connection portions individually to conceal the respective connection portion.

2. The handle of claim 1, wherein the base has a base longitudinal axis and the fastener has a fastener longitudinal axis, and wherein the base is configurable in either of a first position, wherein the base longitudinal axis is substantially coaxially aligned with the fastener longitudinal axis and the fastener is coupled to the first connection portion, and a second position, wherein the base longitudinal axis is substantially perpendicular to the fastener longitudinal axis and the fastener is coupled to the second connection portion.

3. The handle of claim 2, wherein the plug is adapted to engage the second connection portion when the base is in the first position and the first connection portion when the base is in the second position.

4. The handle of claim 1, further comprising a collet coupled to the band and having a receiving portion that is adapted to receive the fastener.

5. The handle of claim 4, wherein the band is constructed of a metallic material and is retractable into the collet.

6. The handle of claim 1, further comprising a grip coupled to the base.

7. The handle of claim 1, wherein the band is arcuate.

8. A power tool and handle combination comprising:
a power tool; and
a handle detachably coupled to the power tool, the handle including:
   a band adapted to grip the power tool;
   a fastener coupled to the band;
   a base having first and second opposing ends, and first and second connection portions, wherein each of the first and second connection portions is adapted to receive the fastener and couple the band to the base, the first connection portion being located proximate the first end and the second connection portion being located between the first and second ends; and
   a plug adapted to be optionally engaged with both of the first and second connection portions individually to conceal the respective connection portion.

9. The combination of claim 8, wherein the base has a base longitudinal axis and the fastener has a fastener longitudinal axis, and wherein the base is configurable in either of a first position, wherein the base longitudinal axis is substantially coaxially aligned with the fastener longitudinal axis and the fastener is coupled to the first connection portion, and a second position, wherein the base longitudinal axis is substantially perpendicular to the fastener longitudinal axis and the fastener is coupled to the second connection portion.

10. The combination of claim 8, wherein the plug is adapted to engage the second connection portion when the base is in the first position and the first connection portion when the base is in the second position.

11. The combination of claim 8, wherein the handle further includes a collet coupled to the band and having a receiving portion that is adapted to receive the fastener.

12. The combination of claim 11, wherein the band is constructed of a metallic material and is retractable into the collet.

13. The combination of claim 8, wherein the handle further includes a grip coupled to the base.

14. The combination of claim 8, wherein the band is arcuate.

15. The combination of claim 8, wherein the power tool includes:
a main body;
a working end disposed on a distal end of the working base;
a tool handle coupled to the main body; and
a battery portion coupled to the tool handle.

* * * * *